US012779529B2

(12) United States Patent
Dalke et al.

(10) Patent No.: US 12,779,529 B2
(45) Date of Patent: Nov. 3, 2026

(54) CONTINUOUS CASTING SPRAY WATER PERFORMANCE MONITORING AND WATER CONTROL CHEMISTRY

(71) Applicant: Ecolab USA Inc., Saint Paul, MN (US)

(72) Inventors: Shawn Dalke, Sugar Grove, IL (US); Daniel Schwarz, Naperville, IL (US); Darlington Mlambo, Aurora, IL (US); Rajeev Dilipkumar, Naperville, IL (US); Raphael Holtz, Aurora, IL (US)

(73) Assignee: Ecolab USA Inc., Saint Paul, MN (US)

( * ) Notice: Subject to any disclaimer, the term of this patent is extended or adjusted under 35 U.S.C. 154(b) by 421 days.

(21) Appl. No.: 18/347,015

(22) Filed: Jul. 5, 2023

(65) Prior Publication Data

US 2024/0009730 A1 Jan. 11, 2024

Related U.S. Application Data

(60) Provisional application No. 63/358,418, filed on Jul. 5, 2022.

(51) Int. Cl.
*B22D 11/06* (2006.01)
*B22D 11/124* (2006.01)
(Continued)

(52) U.S. Cl.
CPC ........ *B22D 11/068* (2013.01); *B22D 11/1245* (2013.01); *C02F 1/52* (2013.01);
(Continued)

(58) Field of Classification Search
None
See application file for complete search history.

(56) References Cited

U.S. PATENT DOCUMENTS 3,432,585 A 3/1969 Watson et al.
3,926,689 A 12/1975 Respen et al.
(Continued)

FOREIGN PATENT DOCUMENTS

CA 2068643 A1 5/1991
CA 2121011 A1 10/1994
(Continued)

OTHER PUBLICATIONS

Coogan et al. "Wisconsin Steel's 8-strand continuous casting installation" Iron and Steel Engineer, 1967, 44(1), pp. 75-79, Abstract only.
(Continued)

*Primary Examiner* — Peter Keyworth
(74) *Attorney, Agent, or Firm* — Fredrikson & Byron, P.A.

(57) ABSTRACT

A method of analyzing water in a continuous casting process and controlling chemical addition to the water may involve measuring, with a plurality of sensors, at least one characteristic of a water in a plurality of different locations of a water recycle system for the continuous casting process. The continuous casting process can have multiple spray nozzles that spray water on a metal being cast, and the water recycle system may include a gravity settling tank, a filter, and a cooling tower. A processor can determine, using the measured at least one characteristic of the water from the plurality of sensors, a composite water quality value for the water in the water recycle system. A chemical additive can be controllably added into the water recycle system based on the determine composite water quality value.

18 Claims, 3 Drawing Sheets

(51) Int. Cl.

| | |
|---|---|
| ***C02F 1/52*** | (2023.01) |
| ***C02F 1/66*** | (2023.01) |
| *C02F 103/16* | (2006.01) |

(52) U.S. Cl.

CPC ............ *C02F 1/66* (2013.01); *C02F 2103/16* (2013.01); *C02F 2209/04* (2013.01); *C02F 2209/05* (2013.01); *C02F 2209/06* (2013.01); *C02F 2209/11* (2013.01)

(56) References Cited

U.S. PATENT DOCUMENTS

| | | | |
|---|---|---|---|
| 3,946,792 | A | 3/1976 | Thalmann |
| 4,016,015 | A | 4/1977 | Respen et al. |
| 4,582,118 | A | 4/1986 | Jacoby et al. |
| 4,830,683 | A | 5/1989 | Ferguson |
| 4,871,211 | A | 10/1989 | Aussel |
| 5,145,585 | A | 9/1992 | Coke |
| 5,311,925 | A | 5/1994 | Waltman |
| 5,634,257 | A | 6/1997 | Kajiwara et al. |
| 5,805,243 | A | 9/1998 | Hatano et al. |
| 5,997,661 | A | 12/1999 | Matsumoto et al. |
| 6,192,968 | B1 | 2/2001 | Renkl et al. |
| 6,210,501 | B1 | 4/2001 | Okano et al. |
| 6,385,832 | B1 | 5/2002 | Grafe et al. |
| 6,776,857 | B2 | 8/2004 | Lee |
| 6,840,251 | B2 | 1/2005 | Gill et al. |
| 7,460,703 | B2 | 12/2008 | Chang et al. |
| 7,537,746 | B2 | 5/2009 | Matsubara et al. |
| 7,942,191 | B2 | 5/2011 | Zhang et al. |
| 8,087,449 | B2 | 1/2012 | Benedetti et al. |
| 8,544,526 | B2 | 10/2013 | Sudau et al. |
| 8,572,826 | B2 | 11/2013 | Bilgen et al. |
| 8,720,244 | B2 | 5/2014 | Takahama et al. |
| 9,384,889 | B2 | 7/2016 | Sun et al. |
| 9,415,431 | B2 | 8/2016 | Xiang et al. |
| 9,566,623 | B2 | 2/2017 | Braidt et al. |
| 9,597,719 | B2 | 3/2017 | Poloni et al. |
| 9,624,913 | B2 | 4/2017 | Friesth |
| 9,682,334 | B2 | 6/2017 | Bioton et al. |
| 9,925,575 | B2 | 3/2018 | Gaensbauer et al. |
| 10,702,917 | B2 | 7/2020 | Pellizzon |
| 10,722,824 | B2 | 7/2020 | Roca et al. |
| 11,007,556 | B2 | 5/2021 | Ueoka et al. |
| 11,020,780 | B2 | 6/2021 | Ueoka et al. |
| 2004/0255987 | A1 | 12/2004 | Schneider et al. |
| 2004/0261206 | A1 | 12/2004 | Ehls et al. |
| 2007/0114175 | A1* | 5/2007 | Suzuki .................. C02F 3/2806 210/96.1 |
| 2007/0199627 | A1 | 8/2007 | Blejde et al. |
| 2007/0209739 | A1 | 9/2007 | Zhao |
| 2008/0314807 | A1* | 12/2008 | Junghanns ........... B01D 61/025 210/85 |
| 2009/0314457 | A1 | 12/2009 | Seidel et al. |
| 2010/0044000 | A1 | 2/2010 | Friedrich et al. |
| 2011/0252616 | A1 | 10/2011 | Neumann et al. |
| 2014/0260476 | A1 | 9/2014 | Januszkiewicz |
| 2016/0362307 | A1* | 12/2016 | Shiner ..................... C02F 1/048 |
| 2018/0104624 | A1 | 4/2018 | Roca et al. |
| 2018/0355455 | A1 | 12/2018 | Shiga et al. |
| 2019/0381550 | A1 | 12/2019 | Gaensbauer et al. |

FOREIGN PATENT DOCUMENTS

| | | | |
|---|---|---|---|
| CH | 679651 | A5 | 3/1992 |
| CN | 1202921 | | 12/1998 |
| CN | 2635236 | Y | 8/2004 |
| CN | 1864878 | | 11/2006 |
| CN | 1923389 | | 3/2007 |
| CN | 1978092 | | 6/2007 |
| CN | 1982483 | | 6/2007 |
| CN | 101003053 | A | 7/2007 |
| CN | 101108394 | A | 1/2008 |
| CN | 101134208 | A | 3/2008 |
| CN | 101144139 | A | 3/2008 |
| CN | 100401036 | C | 7/2008 |
| CN | 201082459 | | 7/2008 |
| CN | 100418667 | C | 9/2008 |
| CN | 101280628 | A | 10/2008 |
| CN | 201164774 | Y | 12/2008 |
| CN | 101608284 | A | 12/2009 |
| CN | 101618406 | A | 1/2010 |
| CN | 101332493 | B | 6/2010 |
| CN | 201506783 | U | 6/2010 |
| CN | 101274199 | B | 8/2010 |
| CN | 101856669 | A | 10/2010 |
| CN | 101892443 | A | 11/2010 |
| CN | 101898233 | A | 12/2010 |
| CN | 201664709 | U | 12/2010 |
| CN | 101417843 | B | 1/2011 |
| CN | 101966570 | A | 2/2011 |
| CN | 201752717 | U | 3/2011 |
| CN | 102101124 | A | 6/2011 |
| CN | 102189111 | A | 9/2011 |
| CN | 101676023 | B | 10/2011 |
| CN | 102206788 | A | 10/2011 |
| CN | 102211160 | A | 10/2011 |
| CN | 102251188 | A | 11/2011 |
| CN | 202020955 | U | 11/2011 |
| CN | 101871105 | B | 12/2011 |
| CN | 102284480 | A | 12/2011 |
| CN | 102310224 | A | 1/2012 |
| CN | 102343373 | A | 2/2012 |
| CN | 102399929 | A | 4/2012 |
| CN | 102430599 | A | 5/2012 |
| CN | 102430732 | A | 5/2012 |
| CN | 101941024 | B | 6/2012 |
| CN | 101972782 | B | 6/2012 |
| CN | 102126017 | B | 6/2012 |
| CN | 102517429 | A | 6/2012 |
| CN | 102586683 | A | 7/2012 |
| CN | 102631806 | A | 8/2012 |
| CN | 202356595 | U | 8/2012 |
| CN | 102699028 | A | 10/2012 |
| CN | 102758051 | A | 10/2012 |
| CN | 102817445 | A | 12/2012 |
| CN | 202590479 | U | 12/2012 |
| CN | 102878887 | A | 1/2013 |
| CN | 102962416 | A | 3/2013 |
| CN | 102990028 | A | 3/2013 |
| CN | 103008371 | A | 4/2013 |
| CN | 103015717 | A | 4/2013 |
| CN | 103157772 | A | 6/2013 |
| CN | 103160754 | A | 6/2013 |
| CN | 103170507 | A | 6/2013 |
| CN | 103173682 | A | 6/2013 |
| CN | 103184304 | A | 7/2013 |
| CN | 103191937 | A | 7/2013 |
| CN | 103215518 | A | 7/2013 |
| CN | 103342407 | A | 10/2013 |
| CN | 103343293 | A | 10/2013 |
| CN | 203235751 | U | 10/2013 |
| CN | 203292182 | U | 11/2013 |
| CN | 103484599 | A | 1/2014 |
| CN | 103556047 | A | 2/2014 |
| CN | 103692160 | A | 4/2014 |
| CN | 103710620 | A | 4/2014 |
| CN | 103805847 | A | 5/2014 |
| CN | 103920729 | A | 7/2014 |
| CN | 103922846 | A | 7/2014 |
| CN | 103938088 | A | 7/2014 |
| CN | 103952640 | A | 7/2014 |
| CN | 103966521 | A | 8/2014 |
| CN | 103978170 | A | 8/2014 |
| CN | 104096712 | A | 10/2014 |
| CN | 104141092 | A | 11/2014 |
| CN | 104174823 | A | 12/2014 |
| CN | 104261609 | A | 1/2015 |
| CN | 104313470 | A | 1/2015 |
| CN | 104313475 | A | 1/2015 |
| CN | 104313481 | A | 1/2015 |
| CN | 104404375 | A | 3/2015 |
| CN | 104451374 | A | 3/2015 |
| CN | 104480398 | A | 4/2015 |

(56) References Cited

FOREIGN PATENT DOCUMENTS

| | | | |
|---|---|---|---|
| CN | 104498818 | A | 4/2015 |
| CN | 104561817 | A | 4/2015 |
| CN | 204262303 | U | 4/2015 |
| CN | 104611630 | A | 5/2015 |
| CN | 104630607 | A | 5/2015 |
| CN | 104651717 | A | 5/2015 |
| CN | 104651723 | A | 5/2015 |
| CN | 204486488 | U | 7/2015 |
| CN | 204504199 | U | 7/2015 |
| CN | 104846168 | A | 8/2015 |
| CN | 104946986 | A | 9/2015 |
| CN | 104972088 | A | 10/2015 |
| CN | 105018834 | A | 11/2015 |
| CN | 105149366 | A | 12/2015 |
| CN | 105169767 | A | 12/2015 |
| CN | 105170667 | A | 12/2015 |
| CN | 105170920 | A | 12/2015 |
| CN | 105177215 | A | 12/2015 |
| CN | 105200349 | A | 12/2015 |
| CN | 204817968 | U | 12/2015 |
| CN | 204892894 | U | 12/2015 |
| CN | 105215310 | A | 1/2016 |
| CN | 105401048 | A | 3/2016 |
| CN | 105436492 | A | 3/2016 |
| CN | 105441787 | A | 3/2016 |
| CN | 105537567 | A | 5/2016 |
| CN | 105642854 | A | 6/2016 |
| CN | 105695659 | A | 6/2016 |
| CN | 105817594 | A | 8/2016 |
| CN | 105821265 | A | 8/2016 |
| CN | 105838988 | A | 8/2016 |
| CN | 105861913 | A | 8/2016 |
| CN | 105886701 | A | 8/2016 |
| CN | 105886940 | A | 8/2016 |
| CN | 105907920 | A | 8/2016 |
| CN | 105964962 | A | 9/2016 |
| CN | 205571370 | U | 9/2016 |
| CN | 106001533 | A | 10/2016 |
| CN | 106011361 | A | 10/2016 |
| CN | 106048389 | A | 10/2016 |
| CN | 106048390 | A | 10/2016 |
| CN | 106086595 | A | 11/2016 |
| CN | 106141129 | A | 11/2016 |
| CN | 205668051 | U | 11/2016 |
| CN | 205816792 | U | 12/2016 |
| CN | 106270476 | A | 1/2017 |
| CN | 106583453 | A | 4/2017 |
| CN | 106623830 | A | 5/2017 |
| CN | 106734200 | A | 5/2017 |
| CN | 106734201 | A | 5/2017 |
| CN | 106735045 | A | 5/2017 |
| CN | 106735124 | A | 5/2017 |
| CN | 106825473 | A | 6/2017 |
| CN | 106906411 | A | 6/2017 |
| CN | 106925735 | A | 7/2017 |
| CN | 107008878 | A | 8/2017 |
| CN | 107201475 | A | 9/2017 |
| CN | 206464533 | U | 9/2017 |
| CN | 107225148 | A | 10/2017 |
| CN | 107246267 | A | 10/2017 |
| CN | 107267886 | A | 10/2017 |
| CN | 107385324 | A | 11/2017 |
| CN | 107385329 | A | 11/2017 |
| CN | 206677140 | U | 11/2017 |
| CN | 107470574 | A | 12/2017 |
| CN | 107487870 | A | 12/2017 |
| CN | 107523750 | A | 12/2017 |
| CN | 107604248 | A | 1/2018 |
| CN | 107617727 | A | 1/2018 |
| CN | 206955669 | U | 2/2018 |
| CN | 108015245 | A | 5/2018 |
| CN | 207386510 | U | 5/2018 |
| CN | 108176829 | A | 6/2018 |
| CN | 108245957 | A | 7/2018 |
| CN | 108372208 | A | 8/2018 |
| CN | 108558156 | A | 9/2018 |
| CN | 108559907 | A | 9/2018 |
| CN | 108568503 | A | 9/2018 |
| CN | 108571000 | A | 9/2018 |
| CN | 108637200 | A | 10/2018 |
| CN | 108787751 | A | 11/2018 |
| CN | 108911238 | | 11/2018 |
| CN | 208161120 | U | 11/2018 |
| CN | 108947001 | | 12/2018 |
| CN | 109079115 | | 12/2018 |
| CN | 109205819 | | 1/2019 |
| CN | 109226257 | | 1/2019 |
| CN | 109500380 | | 3/2019 |
| CN | 109513894 | | 3/2019 |
| CN | 109531054 | | 3/2019 |
| CN | 109574273 | | 4/2019 |
| CN | 109647884 | | 4/2019 |
| CN | 109702162 | | 5/2019 |
| CN | 109722592 | | 5/2019 |
| CN | 109877487 | | 6/2019 |
| CN | 109894588 | | 6/2019 |
| CN | 109913745 | | 6/2019 |
| CN | 110066053 | | 7/2019 |
| CN | 110066904 | | 7/2019 |
| CN | 110079739 | | 8/2019 |
| CN | 110090861 | | 8/2019 |
| CN | 110184525 | | 8/2019 |
| CN | 209349476 | U | 9/2019 |
| CN | 110408860 | | 11/2019 |
| CN | 110438395 | | 11/2019 |
| CN | 110438412 | | 11/2019 |
| CN | 110538874 | | 12/2019 |
| CN | 110538883 | | 12/2019 |
| CN | 110614377 | | 12/2019 |
| CN | 209773063 | U | 12/2019 |
| CN | 209853849 | U | 12/2019 |
| CN | 110665964 | | 1/2020 |
| CN | 110714164 | | 1/2020 |
| CN | 110760754 | | 2/2020 |
| CN | 110820750 | | 2/2020 |
| CN | 110842161 | | 2/2020 |
| CN | 210085031 | U | 2/2020 |
| CN | 110964942 | | 4/2020 |
| CN | 111014306 | | 4/2020 |
| CN | 111014597 | | 4/2020 |
| CN | 111072203 | | 4/2020 |
| CN | 111075455 | | 4/2020 |
| CN | 210367773 | U | 4/2020 |
| CN | 111097797 | | 5/2020 |
| CN | 111117308 | | 5/2020 |
| CN | 111204909 | | 5/2020 |
| CN | 111270127 | | 6/2020 |
| CN | 112794505 | | 5/2021 |
| DE | 3115730 | A1 | 12/1982 |
| EP | 13840 | A1 | 8/1980 |
| EP | 2862673 | A1 | 4/2015 |
| FR | 2477923 | A1 | 9/1981 |
| FR | 2534513 | A1 | 4/1984 |
| JP | 06293815 | A | 10/1994 |
| JP | 10128403 | A | 5/1998 |
| JP | 11288203 | A | 10/1999 |
| JP | 2000094026 | A | 4/2000 |
| JP | 2000135508 | A | 5/2000 |
| JP | 3096289 | B2 | 10/2000 |
| JP | 2000280015 | A | 10/2000 |
| JP | 2000351002 | A | 12/2000 |
| JP | 2001001028 | A | 1/2001 |
| JP | 2002011505 | A | 1/2002 |
| JP | 2002079307 | A | 3/2002 |
| JP | 2002178116 | A | 6/2002 |
| JP | 2002331307 | A | 11/2002 |
| JP | 3407846 | B2 | 5/2003 |
| JP | 2003181521 | A | 7/2003 |
| JP | 2003205309 | A | 7/2003 |
| JP | 3557899 | B2 | 8/2004 |
| JP | 3669323 | B2 | 7/2005 |
| JP | 3738940 | B2 | 1/2006 |
| JP | 2006075895 | A | 3/2006 |
| JP | 2006110555 | A | 4/2006 |

(56) References Cited

FOREIGN PATENT DOCUMENTS

| | | | |
|---|---|---|---|
| JP | 3894176 | B2 | 3/2007 |
| JP | 2007125570 | A | 5/2007 |
| JP | 3985401 | B2 | 10/2007 |
| JP | 2008023574 | A | 2/2008 |
| JP | 4437046 | B2 | 3/2010 |
| JP | 4677326 | B2 | 4/2011 |
| JP | 2013112849 | A | 6/2013 |
| JP | 2013128940 | A | 7/2013 |
| JP | 5716414 | B2 | 5/2015 |
| JP | 2015231597 | A | 12/2015 |
| JP | 2018192500 | A | 12/2018 |
| JP | 2020014038 | A | 1/2020 |
| KR | 1020030052917 | A | 6/2003 |
| KR | 1020050064993 | A | 6/2005 |
| KR | 1020090072660 | A | 7/2009 |
| KR | 1020100104748 | A | 9/2010 |
| KR | 1020110000382 | A | 1/2011 |
| KR | 1020140020450 | A | 2/2014 |
| KR | 1020140083430 | A | 7/2014 |
| KR | 1020140106854 | A | 9/2014 |
| KR | 1020170038274 | A | 4/2017 |
| KR | 101779151 | B1 | 9/2017 |
| KR | 101779549 | B1 | 9/2017 |
| RU | 2275983 | C2 | 5/2006 |
| SU | 650715 | A1 | 3/1979 |
| TW | 201031473 | A | 9/2010 |
| WO | 9811183 | A1 | 3/1998 |
| WO | 2005110931 | A1 | 11/2005 |
| WO | 2009097977 | A1 | 8/2009 |
| WO | 2014091819 | A1 | 6/2014 |
| WO | 2016031169 | A1 | 3/2016 |
| WO | 2022103388 | A1 | 5/2022 |

OTHER PUBLICATIONS

Schneider "Question of Quality in the Working of Low Carbon Steel on Modern Rolling Mills" Wide World Int (1970), vol. 12, No. 3-4, pp. 59-68, Abstract only.

Plambeck "Continuous Casting at Atlantic Steel Co.'s New Plant" Iron Steel Engineering, vol. 56, No. 4, pp. 33-38, Apr. 1979, Abstract only.

"Steel Industry's Cleaning Filter" Iron Age, vol. 226, No. 29, pp. MP23, Dec. 5, 1983, Abstract only.

"Continuous Cleaning Filter" Iron Steel Engineering, vol. 61, No. 1, p. 90, Jan. 1984, Abstract only.

Schumacher et al., "Design considerations for continuous caster water systems" Iron and Steel Engineer, 1984, 61(2), pp. 34-41, Abstract only.

Liu et al. "Surface quality improvement for continuously cast HSLA steel slabs" Kuangye (Taipei, Taiwan), 1985, 29 (2), pp. 149-155, Abstract only.

US Steel Corp "Chester Engineers to Design Water Treatment Facilities for US Steel" Iron Steel Engineering, vol. 62, No. 4, p. 8, Apr. 1985, Abstract only.

Samways "New 3.3 Million Ton/Year Casting Complex in Operation at USS, Gary Works" Iron Steel Engineering vol. 63, No. 8, pp. 24-29, Aug. 1986, Abstract only.

Slowik et al. "Influence of oxide scales on heat transfer in secondary cooling zones in the continuous casting process, part 2: determination of material properties of oxide scales on steel under spray-water cooling conditions" Steel Research, 1990, 61(7), pp. 302-311, Abstract only.

Bigzadeh et al. "Experimental determination of heat transfer coefficient with spray cooling" ASME Heat Transfer and Fluids Engineering Divisions, 1995, vol. 321, p. 750, Abstract only.

Sturgill "The impact of mold flux chemistry on continuous casting secondary cooling water" Steelmaking Conference Proceedings, 1996, 79, pp. 277-283, Abstract only.

Brell et al., "Reducing Spray Blockage on BHP's Slab Caster" , AISE Steel Technology, vol. 77, No. 5, May 1, 2000, pp. 43-46.

Fisher et al., "Caster spray chamber corrosion" Steelmaking Conference Proceedings, 2000, 83rd, pp. 129-138, Abstract only.

Grundmann et al., "Optimised cooling water treatment for the avoidance of deposits during strand cooling" Stahl und Eisen, 2001, 121(8), pp. 69-74, Abstract only.

Cathcart et al., "A collective approach to eliminate internal halfway cracks on continuously cast slabs at Stelco Hilton Works", McMaster Symposium on Iron & Steelmaking, [Proceedings] (2002), 30, pp. 198-210, Abstract only.

Sun, "Characteristics and treatment programs of circulating cooling water in electric furnace continuous casting", Gongye Shuichuli, 2002, 22(4), pp. 19-21, Abstract only.

"Automatic filters prevent nozzle blockages on cooling water system" Filtration and Separation, Apr. 2004, vol. 41, No. 3, pp. 32-33, Abstract only.

Graeme et al. "Exfoliation corrosion on Dofasco's No. 1 continuous caster" Iron and Steel Technology (Jun. 2004), vol. 1, No. 6, pp. 56-62, Abstract only.

Sengupta et al., "The Use of Water Cooling during the Continuous Casting of Steel and Aluminum Alloys", Metallurgical and Materials Transactions, vol. 36A, Jan. 2005, pp. 187-204.

Aizin et al., "Upgrading of the secondary cooling system of steel slab on the basis of mathematical and physical modeling of steel crystallization processes" Stal', 2006, pp. 18-20, Abstract only.

Currey et al. "Improvement of secondary cooling reliability for Dofasco's No. 1 continuous caster" Iron and Steel Technology (Jul. 2006), vol. 3, No. 7, pp. 52-57, Abstract only.

Barros et al. "Impact of Water Treatment Over Production Increase of the Continous Casting # 4 of Companhia Siderurgica Nacional 1" C62DG Congresso Anual da ABM : 62nd ABM International Annual Congress, Jul. 23, 2007, pp. 1816-1825, Abstract only.

Barros et al., "Impact of water treatment management over production increase of caster No. 4 of CSN" Revue de Metallurgie/Cahiers d'Informations Techniques, 2008, pp. 390-397, Abstract only.

Liu et al. "Application of Dynamic Secondary Cooling in Continuous Casting of Steel Slab" Zhuzao Jishu (Foundry Technology). vol. 29, No. 12, pp. 1651-1654, Dec. 2008, Abstract only.

Liu et al. "Dynamic Water Modeling and Application of Billet Continuous Casting" Journal of Iron and Steel Research International. vol. 15, No. 2, pp. 14-17. Mar. 2008, Abstract only.

Echavarria et al. "New approach for the control of fluoride induced corrosion in continuous caster components" AISTech 2009—Proceedings of the Iron and Steel Technology Conference, 2009, vol. 1, pp. 1225-1230, Abstract only.

Jenner et al. "The critical role of water treatment and water quality management in the steelmaking processes" SEAISI Quarterly Journal 2011, pp. 43-51, Abstract only.

Mantovanelli et al., "Secondary cooling system chemical cleaning of the Arcelor-Mittal Tubarao continuous casting machine" Area de Manutencao Mecanica de Producao de Racas, Especialista de Manutencao Mecanica, Brazil SO Congresso Anual da ABM, 2011, pp. 917-925, Abstract only.

Wu et al. "Application of Siemens S7-400 PLC in secondary cooling water control of continuous caster system" Gangtie Yanjiu Research on Iron and Steel, vol. 39, No. 2, pp. 48-50, 54, Mar. 2011, Abstract only.

Yoshitsune et al., "Management system on water treatment in continuous caster" SEAISI Quarterly Journal, 2011, pp. 26-32, Abstract only.

Alves De Souza et al., "Analysis of influence of fluorine-free mold flux on continuous casting of low-carbon steel slabs" Seminario de Aciaria—Internacional, 43rd, Belo Horizonte, Brazil, May 2012, pp. 491-499, Abstract only.

Santos et al., "Reduction of billet scrap quality index due to rhomboidity at Votorantim Siderurgia (Resende, Rio de Janeiro state) steelworks" Seminario de Aciaria—Internacional, 43rd, Belo Horizonte, Brazil, May 20, 2012, pp. 354-364, Abstract only.

Westech, "Flow Sheet Writeup Continuos Caster Cooling Water" WesTech Engineering, Document created Jan. 30, 2013, pp. 1-2.

"AHMSA's plant built in a year" Steel Times International [Steel Times Int.]. vol. 38, No. 1, Jan. 2014, pp. 36, Abstract only.

Lemberg et al. "Integrated approach to the conditioning of CCM's recycled water" Published 2014, Abstract only.

(56) References Cited

OTHER PUBLICATIONS

Liu et al. "Transient Asymmetric Flow and Bubble Transport Inside a Slab Continuous-Casting Mold" Transient Asymmetric Flow and Bubble Transport Inside a Slab Continuous-Casting Mold, 2014, pp. 675-697, Abstract only.

Sampson et al. "Effect of Water Vapor During Secondary Cooling on Hot Shortness in Fe—Cu—Ni—Sn—Si Alloys" Metallurgical and Materials Transactions B: Process Metallurgy and Materials Processing Science, 2014, pp. 1769-1781, Abstract only.

Chabicovsky et al. "Factors influencing spray cooling of hot steel surfaces" METAL 2017—26th International Conference on Metallurgy and Materials, Conference Proceedings, vol. Jan. 2017, pp. 77-82, Abstract only.

Bolduc et al. "Sensitivity study of the influence of the water boiling parameters on aluminum semi-continuous DC casting" International Journal of Thermal Sciences, Published Jan. 24, 2020, pp. 1, Abstract only.

International Searching Authority, "International Search Report and Written Opinion", From Application No. PCT/US2023/069608, Mailed Sep. 28, 2023, pp. 1-19.

Alam et al. "Influence of water quality on rate of quenching of metals during continuous casting by pneumatic and hydraulic sprays" Materials Science and Technology Conference and Exhibition 2016, Materials Science and Technology Conference and Exhibition 2016, vol. 2, pp. 735-744, Abstract only.

* cited by examiner

CONTINUOUS CASTING SPRAY WATER PERFORMANCE MONITORING AND WATER CONTROL CHEMISTRY

RELATED MATTERS

This application claims the benefit of U.S. Provisional Application No. 63/358,418, filed Jul. 5, 2022, the entire contents of which are incorporated herein by reference.

TECHNICAL FIELD

This disclosure relates to metal casting and, more particularly, to water recycle systems for metal casting operations.

BACKGROUND

Continuous casting is a method of converting molten metal into semi-finished metal products such as billets, blooms, or slabs, and is useful for high volume and continuous production. The process is commonly used to form steel, but may be used to form other metals, such as aluminum and copper. Typically in continuous casting, molten metal is collected in a trough called a tundish and then passed into a primary cooling zone. In the primary cooling zone, the molten metal enters a solid mold that is typically water cooled. The solid mold draws heat from the molten metal causing a solid "skin" of metal to form around a still liquid core. The solid clad liquid metal is referred to as a strand. The strand then passes into a secondary cooling zone where water is sprayed directly on the metal strand to further cool the metal.

The water used as a heat transfer medium to cool the metal being cast is typically collected and reused to limit the amount of water consumed in the casting process. The water can be collected after directly or indirectly contacting the hot metal and passed through a cooling tower that cools the water through evaporative cooling before being reused in the casting process.

In practice, water collected from the casting process can contain contaminants, such as corrosive compounds and particulates, liberated from the metal being cast when spray water directly contacts the hot metal. Overtime, these contaminates may build up in the water system, causing water-related problems for the casing process.

SUMMARY

In general, this disclosure is directed to systems and techniques for casting metal and, more particularly, to systems and techniques for analyzing water used in continuous casting processes and/or controlling chemistry added to the water used in the continuous casting process. In some implementations, a system according to the disclosure includes a continuous caster that sprays water directly on metal being cast and a water recycle system that collects water after having been sprayed on the hot metal for recycle and reuse. The water recycle system may process the collected water through gravity settling, filtering, evaporative cooling, and/or other processing steps before delivering the recycled water back to the continuous caster to be sprayed again on another portion of hot metal being cast.

In practice, it can be difficult for an operator of a continuous casting water system to evaluate the quality of the water in the water recycle system to detect and react to incipient problems. The operator may lack insights into the characteristics of the water in the water recycle system and/or may lack understanding how discrete water measurements impact the overall quality and efficacy of the water recycle system. Further, since the composition of the water can change as the water moves through different stages of the water recycle system, it can be challenging to assess how a water measurement made in one portion of the water recycle compares to a different water measurement made in a different portion of the water recycle system to evaluate and implement corresponding control actions.

In accordance with some examples of the present disclosure, a water analysis and chemical control system for a continuous casting process is described that includes multiple sensors arranged at different locations in the water recycle system to measure one or more characteristics of the water at each location in the recycle system. For example, the system may include one or more sensors upstream of a cooling tower in the water recycle system and one or more sensors downstream of the cooling tower in the water recycle system. Each sensor in the system may measure one or more characteristics of the water indicative of the quality of the water, with different sensors measuring the same characteristic or different sensors measuring different characteristics. In either case, the system may aggregate water measurement data obtained from different locations and different sources across the system to determine a composite water quality value. The composite water quality value may provide a single value indicative of the overall quality or health of the water in the water recycle system. The system can then use this composite water quality value to control the addition of one or more chemical additives to the water within the water recycle system. The chemical additive can maintain or improve the quality of the water being recycled and reused within the water recycle system.

The system may aggregate water measurement data obtained from different locations and/or different sources in a number of different ways to determine a composite water quality value. In some examples, the system applies a weighting factor to each water measurement measured by each different sensor in the system. The weighting factor can be different for different water measurements. Accordingly, a water measurement made in one location of the water recycle system may be assigned greater importance in assessing the overall quality of the water in the system than a water measurement made in another location. Specific weighting factors may be assigned based on the type of water characteristic measured, location of the measurement, and/or other factors indicative of water quality and corresponding impact to the water recycle system.

By determining a composite water quality value from multiple different sources and locations providing individualized measurements indicative of water quality, an operator may be provided with a readily monitorable and comparable metric for assessing the overall quality of the water in the water recycle system for the continuous casting process. This can remove the complexity and uncertainty associated with trying to assess a multitude of different water measurements in a water recycle system that may appear uncorrelated and/or appear to be providing contradictory water quality information to the operator. This can allow the operator to take more consistent and predictable action controlling the water in the water recycle system, for example, by introducing fresh or makeup water into the system and/or by introducing one or more chemical additives in the system that help control the performance of the water. In some implementations, the system is implemented to automatically control the water in the water recycle system (e.g., by controlling chemical addition to the water) in response to composite water quality values determined by the system using measurements made by multiple sensors arrayed throughout the water recycle system.

In one example, a water analysis and chemical control system for a continuous casting process is described. The system includes a continuous caster, a water recycle system, a plurality of sensors, a pump, and a controller. The continuous caster has a cooling zone that includes a plurality of spray nozzles configured to spray water on a metal being cast. The water recycle system includes at least a gravity settling tank, a filter, and a cooling tower. The gravity settling tank is fluidly connected to the cooling zone of the continuous caster and is configured to receive water from the cooling zone of the continuous caster after the water contacts the metal being cast and gravity separate the received water to provide a gravity separated water stream. The filter is downstream of the gravity settling tank and is configured to receive the gravity separated water stream and filter the gravity separated water stream to provide a filtered water stream. The cooling tower is downstream of the filter and is configured to receive the filtered water and reduce a temperature of the filtered water stream through evaporative cooling to provide cooling water that is supplied to the plurality of spray nozzles of the continuous caster. The example specifies that the plurality of sensors are configured to measure at least one characteristic of a water sample subject to analysis, with each of the plurality of sensors being fluidly connected at a different location in the water recycle system to measure the at least one characteristic of the water sample at each different location. The pump is positioned to introduce a chemical additive into water in the water recycle system. The controller is communicatively coupled to the plurality of sensors and the pump. The example specifies that the controller is configured to receive data from each of the plurality of sensors indicative of the at least one characteristic of the water sample measured by each of the plurality of sensors, determine a composite water quality value based on the received data from each of the plurality of sensors, and control the pump to control addition of the chemical additive into the water based on the determine composite water quality value.

In another example, a method of analyzing water in a continuous casting process and controlling chemical addition to the water is described. The method includes measuring, with a plurality of sensors, at least one characteristic of a water in a plurality of different locations of a water recycle system for a continuous casting process. The example specifies that the continuous casting process has a plurality of spray nozzles that spray water on a metal being cast and the water recycle system includes at least a gravity settling tank, a filter, and a cooling tower. The method also includes determining, with a processor using the measured at least one characteristic of the water from the plurality of sensors, a composite water quality value for the water in the water recycle system and controlling addition of a chemical additive into the water in the water recycle system based on the determine composite water quality value.

In another example, a water analysis system for a continuous casting process is described. The system includes a continuous caster, a water recycle system, a plurality of sensors, a display, and a controller. The continuous caster has a cooling zone that includes a plurality of spray nozzles configured to spray water on a metal being cast. The water recycle system includes at least a gravity settling tank, a filter, and a cooling tower. The gravity settling tank is fluidly connected to the cooling zone of the continuous caster and is configured to receive water from the cooling zone of the continuous caster after the water contacts the metal being cast and gravity separate the received water to provide a gravity separated water stream. The filter is downstream of the gravity settling tank and is configured to receive the gravity separated water stream and filter the gravity separated water stream to provide a filtered water stream. The cooling tower is downstream of the filter and is configured to receive the filtered water and reduce a temperature of the filtered water stream through evaporative cooling to provide cooling water that is supplied to the plurality of spray nozzles of the continuous caster. The example specifies that the plurality of sensors are configured to measure at least one characteristic of a water sample subject to analysis, with each of the plurality of sensors being fluidly connected at a different location in the water recycle system to measure the at least one characteristic of the water sample at each different location. The example specifies that the controller is configured to receive data from each of the plurality of sensors indicative of the at least one characteristic of the water sample measured by each of the plurality of sensors, determine a composite water quality value based on the received data from each of the plurality of sensors, and control the display to display information indicative of the composite water quality value.

The details of one or more examples are set forth in the accompanying drawings and the description below. Other features, objects, and advantages will be apparent from the description and drawings, and from the claims.

DETAILED DESCRIPTION

Figure 1:
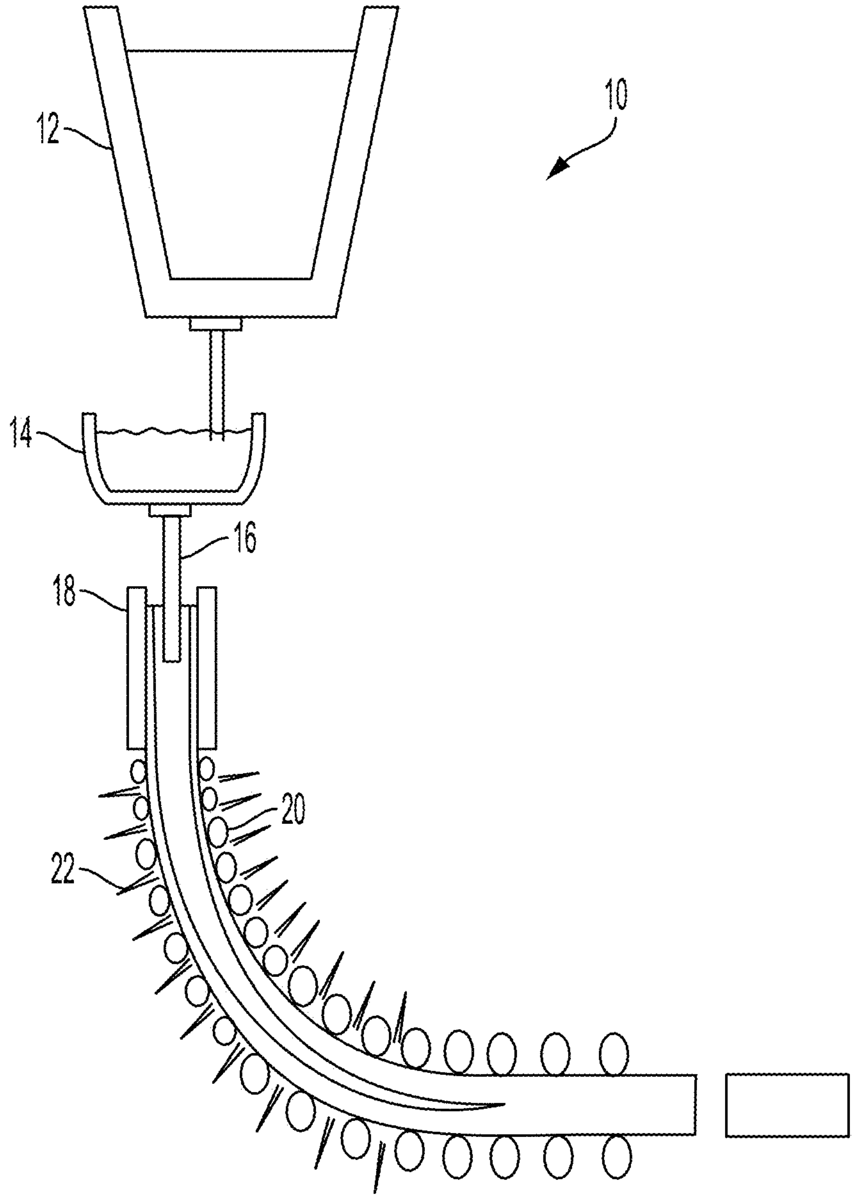
FIG. 1 is a diagram of an example continuous caster that may be used to cast ferrous (steel) metal slabs.

This disclosure is generally directed to metal casting and, more particularly, to systems and techniques for monitoring and/or controlling the water used in the metal casting process. In some implementations, cooling water is applied directly to hot metal during the metal casting process and collected after direct contact with the metal being cast. For example, cooling water may be sprayed directly on the metal being cast as part of a secondary cooling system downstream of a trough from which molten metal exits. The cooling water sprayed against the molten metal can be collected after direct contact with the metal and recycled for reuse in the casting process. Within the water recycle system, the water may be subject to one or more steps to remove particulate present in the water. Additionally or alternatively, one or more chemical additives may be injected into the water to control the chemical composition and performance of the water within the casting process and/or water recycle system.

To provide information concerning the characteristics of the water being collected and processed within the water recycle system for the metal casting process, multiple sensors may be implemented at different locations throughout the water recycle system. Each sensor may measure one or more of a variety of different measurable characteristics of the water, such as optical characteristics (e.g., turbidity), electrical characteristics (e.g., oxidation-reduction potential), and/or chemical characteristics (e.g., pH). Different sensors can measure one or more characteristics of the water at different points in the water recycle system, e.g., before and/or after the water being recycled has undergone various processing steps within the water recycle system. Each sensor can provide measure data indicative of one or more characteristics of the water measured.

The measurements made by the plurality of sensors within the water recycle system may be made in real time and/or intermittently with operation of the water recycle system and/or casting process. The sensorized measurement data may be used alone to assess the overall water quality in the water recycle system or may be combined with one or more other data sources to assess the overall water quality. For example, measurements made by the plurality of sensors within the water recycle system may be combined with data generated from one or more off-line measurements (e.g., off-line chemical analyses of the water) and/or data from a water distribution system in the casting process (e.g., temperature, pressure, and/or flow rate of water supplied to one or more zones and/or nozzles of a water distribution system that sprays water on molten metal being cast).

In either case, a composite water quality value may be determined from multiple different measured values associated with the water in the continuous casting process and/or water recycle system. For example, a composite water quality value may be determined by aggregating different individual water characteristic measurements from different sensors arrayed at different locations throughout the water recycle system. The composite water quality value may be a numerical value indicative of the quality of the water being used in the casting process and recycled to the water recycle system that is a composite of different water measurements. The composite water quality value may be displayed on a display viewed by personnel operating the water recycle system for individual evaluation and/or control action. Additionally or alternatively, one or more control actions for the water recycle system may be automatically implemented based on the determined composite water quality value. For example, the determined composite water quality value may be compared to one or more thresholds, and one or more chemical pumps controlled to introduce one or more chemical additives to the water in the water recycle system based on the comparison.

Additional details on example water recycle systems and associated techniques for controlling water recycle systems will be described with respect to FIG. 3. However, example continuous casting processes that may include a water recycle system and associated water analysis and/or chemistry control techniques according to the disclosure will first be described with respect to FIGS. 1 and 2.

FIG. 1 is a diagram of an example continuous caster 10 that may be used to cast ferrous (steel) metal slabs. In the illustrated example, liquid metal flows from the bottom of a ladle 12 into a small intermediate vessel known as the tundish 14. The liquid metal leaves the tundish bottom through a submerged nozzle 16, and a stopper-rod or slide-gate flow control system can control the volume of liquid metal discharging from the tundish. The liquid metal is directed into a solid mold 18 (frequently made of copper), which can have water-cooled walls. Within the mold 18, the liquid metal may form a thin solid shell or skin around a liquid core.

At steady state, the solid shell with liquid core can exit mold 18 as a stable strand, exhibiting adequate mechanical strength to support the liquid metal core. Caster 10 can include motor-driven drive rollers 20 (and/or idler rollers) located vertically below the mold to continuously withdraw the strand downward. Positioning rollers 20 closely spaced together can help support the strand and prevent outward bulging of the shell due to the ferrostatic pressure arising from the liquid steel core. Other strategically placed rollers 20 may bend the shell to follow a curved path and then straighten it flat prior to a torch that cuts the strand into individual slabs.

To help cool the strand of metal drawn from mold 18 and passing through rollers 20, caster 10 can include a plurality of spray nozzles 22 positioned to spray water directly and/or indirectly on the strand of metal drawn downwardly from mold 18. For example, spray nozzles 22 may be interspaced between rollers 20 and can spray high pressure water against the strand to help cool the strand during the solidification process.

Figure 2:
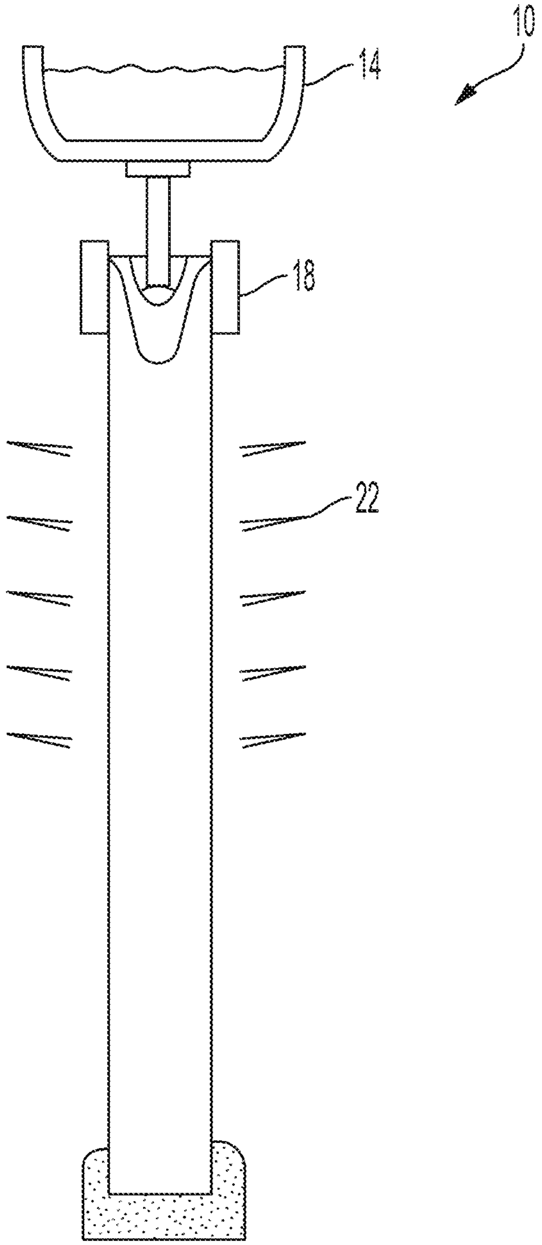
FIG. 2 is a diagram of another example continuous caster that may be used to cast non-ferrous metal ingots.

FIG. 2 is a diagram of another example continuous caster 10 that may be used to cast non-ferrous (e.g., aluminum, copper) metal ingots. Caster 10 in FIG. 2 also includes a tundish 14 and mold 18. In contrast to the fully continuous casting process of FIG. 2, caster 10 in FIG. 2 may implemented for semi-continuous casting in which a strand metal having an outer solidified shell and molten core is drawn vertically downwardly from mold 18 a short length (e.g., 10 meters) until the resulting cast ingot reaches the bottom of the casting pit. The delivery of molten metal to mold 18 may be repeatedly stopped and restarted as successively formed ingots are removed from the casting pit to cool. In either case, caster 10 of FIG. 2 can also include a plurality of spray nozzles 22 to spray water directly on the solid shell emerging from mold 18.

In caster 10 of both FIGS. 1 and 2, thermal energy from the metal being cast can be removed from a primary cooling system and/or from a secondary cooling system. Thermal energy may initially be removed from the metal being cast by using a water-cooled mold in which the cooling water is separated from the metal by the walls of mold 18 to indirectly cool the metal. Heat transport in the liquid pool inside mold 18 and at the mold/metal interface can affect both initial solidification at the meniscus and growth of the solid shell against the mold. This heat transfer at the metal/mold interface can be referred to as mold cooling or primary cooling.

After emerging from mold 18, the cast strand can also be cooled by direct contact of water with the hot meal surface. This can be referred to as secondary cooling. For example, when casting steel such as in the configuration of FIG. 1, banks of nozzles 22 can be located between contact rollers 20 beneath mold 18 to spray water to cool the moving metal strand. The spray nozzles may be arranged into banks or cooling zones, assigned to the top and bottom surfaces of particular strand segments. Water can be forced under high pressure out spray nozzles 22 as droplets that form a mist, which continuously impacts upon the metal surface. When casting non-ferrous metal such as in the configuration of FIG. 2, spray nozzles 22 in the form of water jets can emerge from holes located below the water-cooled mold 18 and directly contact the metal surface. These jets can form a continuous film of water, which wets the vertical ingot surfaces and rolls downward.

Independent of the specific configuration of the caster 10, the water used to cool the molten metal in the casting process can be recovered and recycled for reuse in the casting process. FIG. 3 is a diagram of an example water recycle system 50 that can be utilized with a continuous caster 10, such as that described above with respect to FIGS.

1 and 2. In the example of FIG. 3, water recycle system 50 is illustrated as a network of one or more fluidly connected process units that sequentially process water used to cool metal cast on caster 10 and return the water back to the caster for reuse in cooling a subsequent segment of metal being cast. Water recycle system 50 may include one or more settling tanks, filters, thermal transfer units (e.g., heat exchangers, cooling towers), strainers, and/or other processing units effective to recycle the water for reuse in caster 10. As will be described in greater detail below, a variety of sensors may be implemented at different locations in water recycle system 50 for analyzing water characteristics at different points in the water recycle system. Measurement data from the different sensors can be used to assess a composite water quality value for the overall water recycle system.

Figure 3:
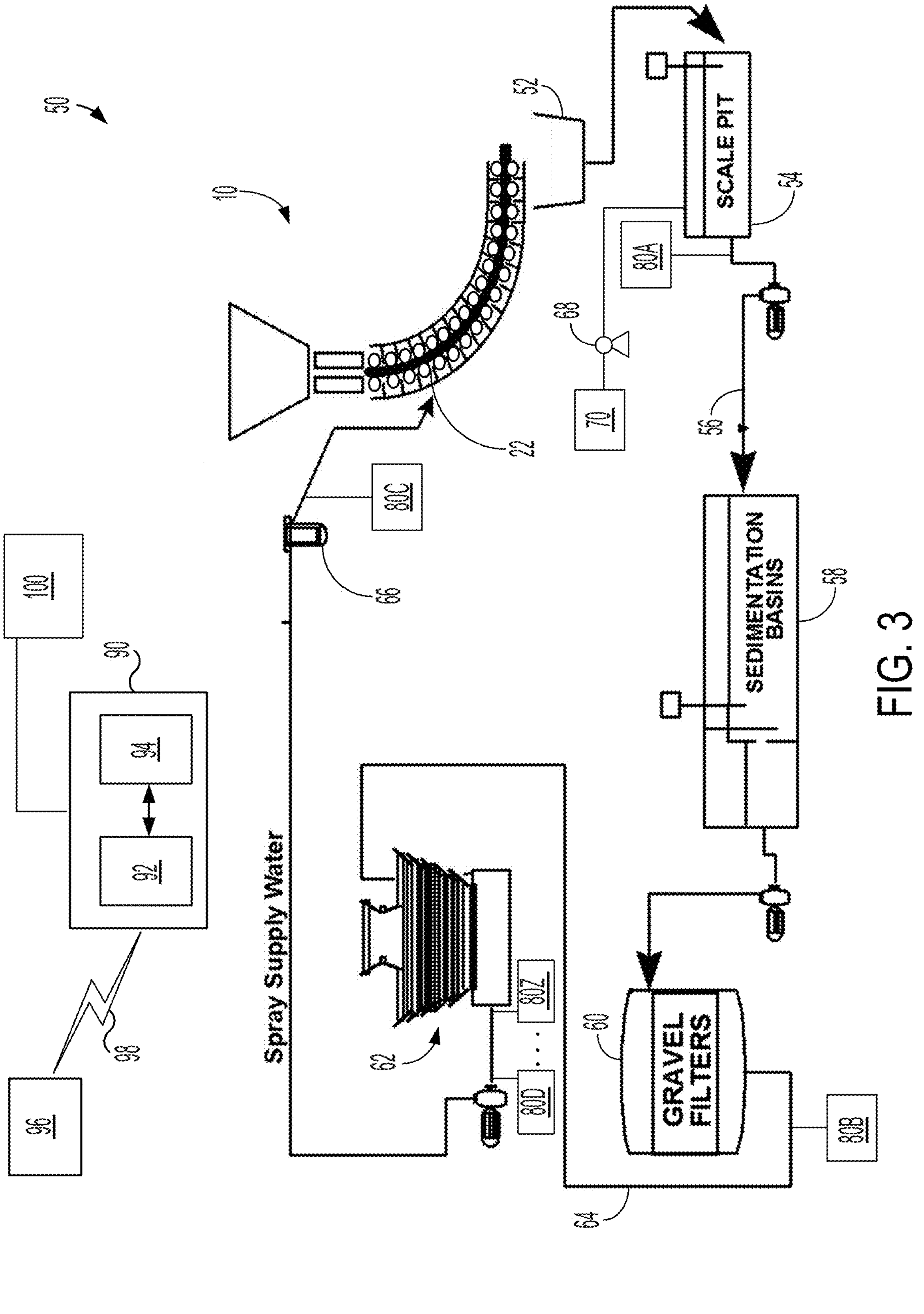
FIG. 3 is a diagram of an example water recycle system that can be utilized with a continuous caster, such as that described with respect to FIGS. 1 and 2.

In the example of FIG. 3, water recycle system 50 is illustrated as including a trough or flume 52 that collects water from a cooling zone of caster 10. For example, flume 52 may be configured to collect cooling water sprayed via spray nozzles 22 directly against metal being cast after the cooling water has contact the metal and fallen downwardly with respect to gravity into the flume. Flume 52 can be fluidly connected to one or more downstream processing units in water recycle system 50 to process the collected cooling water for reuse. The cooling water collected for processing in recycle system 50 can include scale, particulates, oil (e.g., which may be applied and used to help cool the steel), and/or other possible contaminants which may be partially or fully removed by water recycle system 50 before reusing the water in caster 10.

For example, water recycle system 50 may include one or more gravity settling tanks 54 which, in the example of FIG. 3, is illustrated as including a scale pit. Gravity settling tank 54 may include an oil skimmer and solids scraper. In gravity settling tank 54, received water may be gravity settled over a retention time to remove the larger scale and particulate, as well as to skim the oil from the water. In some implementations, water recycle system 50, including gravity settling tank 54 may receive wastewater from the hot roll and other miscellaneous processes throughout the mill. This can contribute organics, heavy metals, and other contaminants to the scale pit, which also be treated in the water recycle stream. In either case, gravity settling tank 54 can gravity separate the received water to provide a gravity separated water stream 56.

As noted, water recycle system 50 may include multiple gravity settling tanks 54. For example, in addition to utilizing a scale pit that receives cooling water from flume 52, cooling water system 50 may also include a sedimentation tank 58 downstream of the scale pit 54. In sedimentation tank 58, the velocity of the cooling water can be lowered below the suspension velocity and suspended particles settle out of the water due to gravity. Sedimentation tank 58 may typically be rectangular or circular with a radial or upward water flow pattern.

One or more filters 60 may be located between gravity settling tank 54 and a cooling tower 62 in water recycle system 50. For example, one or more filters 60 may be located downstream of sedimentation tank 56 and upstream of cooling tower 50 in the water recycle system. The one or more filters 60 may be implemented as deep bed filters having one or more layers of media (e.g., gravel). The deep bed filters can be used to remove the fine particulates suspended in the water and to coalesce the remaining oil. The one or more filters 60 can receive gravity separated water stream 56 (directly from gravity settling tank 54 or indirectly via one or more intermediate processes) and filter the gravity separated water stream to provide a filtered water stream 64.

Cooling tower 62 in water recycle system 50 is located downstream of filter 60 and is configured to receive filtered water 64 and reduce a temperature of the filtered water stream through evaporative cooling to provide cooled water that then is supplied to the plurality of spray nozzles 22 of continuous caster 10. For example, at cooling tower 62, thermal energy transferred to the cooling water stream at caster 10 can be removed and discharged to atmosphere. Cooling tower 62 may bring the cooling water stream in direct contact with air, resulting in a reduction in the temperature the cooling water stream through evaporative cooling. The cooling water may be delivered to a sump or reservoir before being discharged downstream to caster 10.

Water discharging cooling tower 62 can be supplied downstream to spray nozzles 22 that supply water to metal being cast in caster 10. The water may be supplied directly from cooling tower 62 to spray nozzles 22 without intermediate processing, or the water may undergo one or more additional processing steps downstream of the cooling tower before being supplied to the spray nozzles. For example, a strainer 66 may be fluidly connected between cooling tower 62 and the plurality of spray nozzles 22 in caster 10. Strainer 66 may strain (e.g., filter) the cooling water prior to supply to the plurality of spray nozzles 22 of continuous caster 10. This may provide a final polishing or clean-up of the cooling water, helping to remove residual particulate that may otherwise plug or interfere with the operation of spray nozzles 22.

To help remove contaminates from the cooling water in water recycle system 50 and/or to reduce or eliminate potential fouling conditions in the cooling water stream passing through system, one or more chemical additives may be added to the cooling water. In the configuration of FIG. 1, water recycle system 50 includes one or more pumps 68 fluidly connected to one or more chemical additive reservoirs 70. Pump 68 can operate to add one or more chemical additives to the cooling water. The chemical additives may be selected to function as one or more of a coagulant, a flocculant, a dispersant, a biocide, an anticorrosion additive, and/or a pH control agent. Example chemical additives that may be injected into the cooling water include, but are not limited to, a polymer (scale inhibitor), an organophosphorus compound such as zinc polyphosphate, zinc orthophosphate, and/or zinc organo-phosphorous compound (scale and corrosion inhibitors), and a biocide. Additionally or alternatively, one or more chemical additives may be injected into the cooling water to adjust the pH of the cooling water. Examples of pH adjusting compounds include mineral acids, organic acids, and inorganic bases.

In the illustrated configuration of FIG. 3, pump 68 is illustrated as adding chemical additive to the cooling water in gravity settling tank 54. In practice, one or more chemical additives may be introduced to the cooling water at any suitable location, including downstream of cooling tower 62, upstream of the cooling tower, and/or at the cooling tower, such as at a sump associated with the cooling tower. Moreover, while system 50 in FIG. 3 illustrates a single pump 68 fluidly coupled to a single chemical additive reservoir 70, pump 68 may be in selective fluid communication with multiple reservoirs containing different chemicals and/or system 50 may include multiple pumps each configured to introduce a different chemical into the cooling water.

To help monitor the condition of the cooling water collected by flume 52 and/or being processed by water recycle system 50, multiple sensors 80A, 80B, . . . 80Z (collectively referred to as sensor 80) may be deployed to monitor the cooling water at different locations in the processing circuit of the water recycle system. Each sensor 80 can measure one or more characteristics of the cooling water at a particular location in water recycle system 50, providing an indication of the condition of the cooling water at that measured location. Example characteristics of the cooling water that may be measured by a sensor 80 include, but are not limited to, a characteristic indicative of the concentration and/or size of particulate in the water (e.g., turbidity, total suspended solids), an electrical characteristics of the water (e.g., conductivity, oxidation-reduction potential), a concentration or amount of one or more compounds in the water (e.g., concentration of oil in the cooling water), pH of the water, and/or other characteristics indicative of the presence and/or extent of one or more contaminants in the cooling water. Each sensor can be communicatively connected to a controller 90 for processing data measured by the sensors, determining a composite water quality value, and, optionally, controlling one or more chemical additives dispensed in the water flowing through water recycle system 50.

Each sensor 80 can be implemented to measure one or more characteristics of the cooling water being processed in water recycle system 50 at a variety of locations in the water recycle system. In some examples, water recycle system 50 includes at least one sensor 80 located upstream of one or more processing units in the water recycle system and also includes at least one sensor 80 located downstream of the one or more processing units in the water recycle system. This can provide different measurements and insights regarding a change in the characteristic(s) of the water as the water is processed through one or more processing units in the water recycle system.

For example, in one implementation, water recycle system 50 includes at least one sensor 80 positioned to measure at least one characteristic of the water forming gravity separated water stream 56 (e.g., by measuring the water in and/or discharging from one or more gravity settling tanks 54). Water recycle system 50 may additionally or alternatively include at least one sensor positioned to measure at least one characteristic of the water forming filtered water stream 64 (e.g., by measuring the water in and/or discharging from one or more filters 60). As still a further additional or alternatively example, water recycle system 50 include at least one sensor positioned to measure at least one characteristic of the water downstream of strainer 66, e.g., between strainer 66 and the plurality of spray nozzles 22 to which the water is subsequently delivered. Thus, in some implementations, water recycle system 50 can include at least one sensor 80 positioned to measure at least one characteristic of the water being processed in water recycle system 50 at a location upstream of cooling tower 62 and at least one characteristic of the water being processed in water recycle system at a location downstream of the cooling tower.

In the example of FIG. 3, system 50 is illustrated as including a sensor 80A that measures a characteristic of the water forming gravity separated water stream 56, a sensor 80B that measures a characteristic of the water forming filtered water stream 64, and a sensor 80C that measures a characteristic of the water downstream of strainer 66 and upstream of spray nozzles 22. Water recycle system 50 may include a different arrangement of processing units and/or a different number and/or arrangement of sensors 80 than the specific example of FIG. 3. In some examples, for instance, water recycle system 50 may include one or more sensors 80D . . . 80Z that measure one or more characteristics of the water in cooling tower 62. For example, the one or more sensors may be positioned to measure one or more characteristics of the water in the sump of cooling tower 62 and/or discharging from the cooling tower.

In some examples, one or more of sensors 80 may be implemented using an optical sensor to provide a measurement indicative of a concentration and/or size of particles in the cooling water. For example, an optical sensor may be used to measure the turbidity and/or light scatting characteristics of the water in water recycle system 50. Additionally or alternatively, the optical sensor may measure total suspended solids in the water.

Other examples of sensor 80 that may be used in addition to or in lieu of an optical sensor include an oxidation-reduction potential (ORP) sensor to measure the ORP of the cooling water, a pH sensor to measure the pH of the cooling water, a conductivity sensor to measure the conductivity of the cooling water, an oil-in-water sensor to measure a concentration of oil in the cooling water, a fluorometer to measure directly or indirectly a concentration of one or more chemical additives dosed in the system (e.g., by a fluorescent response proportional to the concentration of the chemical additive), a deposit monitor to measure a fouling deposit rate in the water system (e.g., a biofilm fouling, inorganic deposit fouling, and/or organic deposit fouling), and/or a sensor to measure a corrosion rate in the water system. Additional or different sensors can be used to measure additional or different characteristic(s) of the water.

Each sensor 80 can be implemented in number of different ways in water recycle system 50. For example, one or more of the sensors can be positioned in line with cooling water flowing through a portion of water recycle system 50 (e.g., upstream, downstream, and/or within a processing unit of the water recycle system) either directly or via a slipstream pulled from the main water stream. Alternatively, one or more of the sensors may be implemented as an off-line monitoring tool that is not in direct fluid communication with cooling water flowing through water recycle system 50. In these applications, cooling water flowing through water recycle system 50 may be extracted from the system and measured using an off-line analysis system. Such off-line analysis may involve direct evaluation of the sample, e.g., using one or more sensors, or may involve further processing on the sample, such as performing wet chemistry processing on the sample to generate data associate with the sample. In either case, data generated by each of the one or more sensors 80 and/or otherwise associated with cooling water under evaluation can be received by controller 90, e.g., for storage in memory and/or further processing. Moreover, discussion of a sensor 80 analyzing a water sample from water recycle system 50 is not intended to limit the manner in which the sensor is exposed to the water or the amount of water provided to the sensor.

The specific number of sensors 80 implemented in water recycle system 50 can vary based on a number of factors, such as the size and complexity of the water recycle system and the number and configuration of different water processing units in the water recycle system. In various implementations, water recycle system 50 may include at least two sensors 80 providing measurement data to controller 90 for determining a composition water quality value, such as three, four, five, six, or more sensors. Each sensor 80 may determine the same characteristic of the water analyzed (e.g., turbidity, pH, conductivity), or at least one sensor 80 may determine a characteristic of the water analyzed different than the characteristic of the water analyzed by one or more other sensors 80. Accordingly, a composite water quality value determined for water recycle system 50 may be based on the same and/or different measured water characteristics in the water recycle system.

For example, in the arrangement of FIG. 3, first sensor 80A may be implemented using an optical sensor that measures a turbidity of the water and/or an oil-in-water sensor to measure a concentration of oil in the water. Second sensor 80B may also be implemented using an optical sensor that measures a turbidity of the water and/or an oil-in-water sensor to measure a concentration of oil in the water. Third sensor 80C may also be implemented using an optical sensor that measures the turbidity of the water. One or more additional sensors 80D . . . 80Z may measure the conductivity, pH, and/or ORP of the water.

It should be appreciated that although the one or more sensors 80 are illustrated and described with respect to FIG. 3 as being discreet sensors, in other implementations, a single sensor may be implemented to measure the same characteristic from different locations in water recycle system 50. For example, different conduits may fluidly connect a sensor 80 to different locations in water recycle system 50 to bring water from the different locations to the sensor for analysis. When so configured, sensor 80 fluidly connected to different locations in water recycle system 50 may be alternately placed in fluid communication with water from the different locations to measure a characteristic of the water in the different sources.

Water recycle system 50 may include additional and/or different sensors to measure different operational parameters of water recycle system 50. For example, the system may include one or more flow sensors, temperature sensors, and/or pressure sensors to measure the flow rate, temperature, and/or pressure of the cooling water at one or more desired locations in the water recycle system. Water recycle system 50, including controller 90 of the water recycle system, can monitor data from one or more sensors online and/or receive data from a third party source concerning the water recycle system. One example of such data that may be received from a third party source can include data concerning a flow rate, temperature, and/or pressure of the cooling water supplied to and/or discharging from the plurality of spray nozzles 22, which may be measured by an operator of caster 10 different from an operator controlling water recycle system 50. Measurement data received by controller 90 from a third party source may be used in determining a composite water quality value for the water recycle system. For example, if measurement data received from the third party source indicates a pressure and/or flow rate drop of the cooling water supplied by spray nozzles 22, such information may indicate that contaminants in the cooling water are plugging or limiting flow through the spray nozzles.

Water recycle system 50 in the example of FIG. 3 includes controller 90. Controller 90 can be communicatively connected to the plurality of sensors 80 and controllable components of the water recycle system to manage the overall operation of the system. For example, controller can be communicatively connected to each of sensors 80, pump 68, and/or other controllable components in the water recycle system.

Controller 90 includes processor 92 and memory 94. Controller 90 can communicate with communicatively connected components via a wired or wireless connection, which are not illustrated in the example of FIG. 3 for purposes of simplicity. Controls signals sent from controller 90 and received by the controller can travel over the connection. Memory 94 stores software for running controller 90 and may also store data generated or received by processor 92, e.g., from sensors 80. Processor 92 runs software stored in memory 94 to manage the operation of water recycle system 50.

Controller 90 may be implemented using one or more controllers, which may be located at the facility site containing the processing units defining water recycle system 50. Controller may communicate with one or more remote computing devices 96 via a network 98. For example, controller 90 may communicate with a geographically distributed cloud computing network, which may perform any or all of the functions attributed to controller 90 in this disclosure. Data generated and/or received by controller 90 and/or remote computing devices 96 may be displayed on one or more electronic displays 100 viewable by an operator of water recycle system 50.

Network 98 can be configured to couple one computing device to another computing device to enable the devices to communicate together. Network 98 may be enabled to employ any form of computer readable media for communicating information from one electronic device to another. Also, network 98 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one to another. Communication links within LANs may include twisted wire pair or coaxial cable, while communication links between networks may utilize analog telephone lines, full or fractional dedicated digital lines, Integrated Services Digital Networks (ISDNs), Digital Subscriber Lines (DSLs), wireless links including cellular and satellite links, or other communications links. Furthermore, remote computers and other related electronic devices may be remotely connected to either LANs or WANs via a modem and temporary telephone link.

Display 100 can display information indicative of water characteristics measured by each of the individual sensors 80, a composite water quality value determined for water recycle system 50, and/or the control of one or more chemical additives added to water being processed in the water recycle system. Information can be displayed to an operator of water recycle system 50 in any suitable format, including textually and graphically. In some examples, display 100 is controlled to display information indicative of the composite water quality value determined for water recycle system 50. Such information may be displayed in the form of a numerical output, which may be an absolute value for the composite water quality value or a scaled value (e.g., as a fraction of 1.0 or percentage of 100%). Additionally or alternatively, information associated with the determined composite water quality value may be displayed with a corresponding indication of risk or the desirability of taking control action. For example, a color coding associated with the composite water quality value (e.g., red, yellow, green) may be determined by controller 90 and displayed on display 100 to indicate relative risk associated with the determined composite water quality value.

In operation, the plurality of sensors 80 can generate data indicative of one or more characteristics of the water in water recycle system 50. In addition, when implemented with additional sensors, such as temperature, flow rate, and/or pressure sensors, such sensors can generate data indicative of a corresponding measured characteristic. Controller 90 can receive data from the sensors deployed throughout water recycle system 50 (in addition to or in lieu of receiving data from an external source, such as data indicative of the operation of caster 10 and/or cooling tower 62) and use data received to determine a composite water quality value for water recycle system 50. The composite water quality value can provide a single parameter aggregating different measurements and/or data streams across water recycle system 50. This can harmonize and aggregate different discrete measurements for analysis and system control, leading to more consistent, predictable, effective control of water recycle system 50 in the water flowing through the system.

Controller 90 may receive data from the sensors in water recycle system 50 and determine the composite water quality value continuously or on a periodic basis. For example, controller 90 may determine the composite water quality value at least once per day, such as at least once per hour, at least once per minute, or at least once per second. The frequency with which controller 90 calculates the composite water quality value may vary depending on the sampling rate of the sensors in water recycling system 50, the processing capacity of controller 90, and/or an operator input selecting the frequency with which the composite water quality value should be calculated.

In some examples, controller 90 processes the data received from sensors 80 prior to calculating the composite water quality value. For example, controller 90 may smooth the data using a statistical smoothing algorithm to remove noise and outliers from the data. Controller 90 may then determine the composite water quality value using smoothed data. Alternatively, controller 90 may calculate composite water quality values for the raw data and apply the smoothing algorithm to the calculated values.

In general, controller 90 may determine the composite water quality value for water recycle system 50 based on the received data from the plurality of sensors 80 and/or based on data received from sources other than sensors 80. Controller 90 may aggregate data from the different sensors using a variety of different computational and/or sensor fusion techniques. In some examples, controller 90 applies a weighting factor to the measured characteristic of from each sensor 80. Each weighting factor can correspond to the predictive strength and probative value a particular measurement has on the quality of water in water recycle system 50. A particular weighting factor may be determined based on causal analysis of empirical data relating a particular measured water characteristic at a particular location in water recycle system 50 to the quality of water in the water recycle system. The weighting factor may be further adjusted upwardly or downwardly based on application-specific factors related to the particular water recycle system 50 being monitored and controlled. Weighting factors may be programmed into a memory associated with controller 90 and used by the controller to determine a predicted cause of fouling associated with the detected change in heat transfer efficiency trend.

In some implementations, weighting factors applied to the different measured water characteristics from the different locations in water recycle system 50 may be scaled as a fraction of 1.0 or percentage of 100%. For example, a number of weighting factors may be assigned that correspond to the number of parameters included in the calculation of the composite water quality value. The individual weighting factors may add together to equal 1.0 or 100%. Parameters that are comparatively highly correlated with the quality of water in water recycle system 50 may receive a comparatively high weighting (e.g., a weighting factor of 15% or more, such as 20% or more, or 25% or more). Parameters that are moderately correlated with the quality of water in water recycle system 50 may receive a comparatively moderate weighting (e.g., a weighting factor from 7% to 15%). Parameters that are lesser correlated with the quality of water in water recycle system 50 may receive a comparatively low weighting (e.g., a weighting factor less than 7%, such as 5% or less, or 3% or less, or 2% or less). Weighting factors applied to the different measured water characteristics may include a combination of high weightings, moderate weightings, and/or low weightings.

Controller 90 can apply a weighting factor by multiplying a respective data parameter by its corresponding weighting factor. Depending on the number of data points available for a particular parameter, controller 90 may average multiple measurements of the parameter and apply the weighting factor to an averaged value of the parameter. For example, controller 90 may determine a mean, median, or mode of the multiple data points to provide an average of the parameter, and then apply the weighting factor to the averaged parameter.

Controller 90 may apply a weighting factor to an individual measured parameter (e.g., a turbidity value, pH value, conductivity value, oil concentration value, ORP value, pressure value) by multiplying the weighting factor by the parameter. Additionally or alternatively, controller 90 may normalize different individual measured parameters to a uniform numerical scale and apply the weighting factor to each normalize parameter. Normalizing different individual measured parameters can be helpful when determining the composite water quality value based on different measured characteristics of the water, each of which may be scaled differently and/or within a different numerical range.

For example, controller 90 may compare each parameter included in the calculation of the composite water quality value (e.g., each measured water characteristic from the plurality of sensors 80) to preestablished risk categories stored in memory 94 of controller 90. Each risk category may have multiple corresponding thresholds for the parameter (e.g., high, medium, and/or low thresholds), with different categories covering different ranges for the relevant parameter. For example, memory 94 of controller 90 may store a low risk category associated with a first numerical range or value of a particular parameter, a medium risk category associated with a second numerical range or value of the particular parameter different than the first numerical range, and/or a high risk category associated with a third numerical range or value of the particular parameter different than the first and second numerical ranges. The third numerical range or value may be greater than or less than the second numerical range or value which, in turn, can be greater than or less than the first numerical range or value. Any number of different categories can be stored in memory 94 of controller 90, each of which can be defined by a numerical range for the relevant parameter, such as two, three, four, or more categories for each parameter.

Controller 90 can compare the measured and/or received value for a particular parameter (the measured value of the water characteristic for each of the plurality of sensors 80) and compare the actual value to the corresponding ranges of values associated with the different categories stored in memory 94. Controller 90 can determine which range the measured and/or received value falls within and assign the measured and/or received value to the category associated with that range.

Memory 94 of controller 90 may store a normalized numerical value associated with each risk category, with different parameters having the same normalized numerical value for each risk category associated with that parameter. The normalized numerical value may be higher (or lower depending on the scaling) for each category designated as being of higher comparative risk than each category designated as being of comparatively lower risk. Controller 90 may then apply a weighting factor the normalized numerical value associated with each individual measured parameter by multiplying the weighting factor by the normalized numerical parameter.

Although the specific weighting factors and normalized numerical values applied by controller 90 can vary based on the application, Tables 1 provide ranges of exemplary weighting factors and normalized numerical values that may be applied to different parameters.

TABLE 1

Example parameters corresponding to example normalized numerical values and weighting factors.

| | Risk Category 1 | | Risk Category 2 | | Risk Category 3 | | Weight |
|---|---|---|---|---|---|---|---|
| Parameter | Low | High | Low | High | Low | High | Factors |
| Sensor measurement 1 | 0 | 20 | 20 | 40 | 40 | 999 | 5.00% |
| Sensor measurement 2 | 0 | 10 | 10 | 15 | 15 | 999 | 12.00% |
| Sensor measurement 3 | 0 | 10 | 10 | 15 | 15 | 999 | 20.00% |
| Sensor measurement 4 | 0 | 5 | 5 | 10 | 10 | 999 | 7.50% |
| Sensor measurement 5 | −0.05 | 999 | −0.25 | −0.05 | −999 | −0.25 | 18.00% |
| Sensor measurement 6 | 6 | 8.5 | 8.5 | 9 | 9 | 14 | 9.50% |
| Sensor measurement 7 | 0 | 5000 | 5000 | 6000 | 6000 | 9999 | 4.00% |
| Sensor measurement 8 | 9999 | 340 | 340 | 320 | 320 | −999 | 2.00% |
| Received data 1 | 0 | 1 | 1 | 10 | 10 | 52 | 20.00% |
| Received data 2 | 0 | 5 | 5 | 6 | 6 | 100 | 2.00% |
| | | | | | | | 100% |
| Normalized Numerical Value | 1 | | 3 | | 10 | | 10 |

To determine a composite water quality value, controller 90 may sum the individual measured and/or received parameters on which the composite water quality value is based, such as by summing the weighted individual measured parameters and/or weighted normalized parameters. For example, controller 90 may add individual numerical values associated with each measured and/or received parameter (e.g., processed as described herein) to calculate a numerical composite water quality value. The calculated composite water quality value may be further scaled or normalized by controller 90.

In some examples, controller 90 compares the determined composite water quality value to one or more threshold water quality values. Each threshold water quality value may be indicative of a different quality level of the water in water recycle system 50. The specific threshold value(s) against which controller 90 compares the composite water quality value may vary, e.g., based on the magnitude of the weighting factors applied.

Various control actions can be taken in response to the composite water quality value determined by controller 90 and/or based on comparison of the composite water quality value to one or more thresholds. As one example, controller 90 may control one or more pumps 68 to control addition of one or more chemical to the cooling water. In some examples, controller 90 starts pump 68 or increases the operating rate of pump 68. Additional control actions that may be taken by controller 90 and/or an operator of system 50 include, for example, introducing fresh water into the water recycle system, flushing or controlling a processing unit (e.g., filter of the system), or otherwise taking control action to modify the operation of water recycle system 50. In addition to or in lieu of taking control actions, information indicative of the determined composite water quality value can be displayed on display 100 for visualization by an operator of water recycle system 50

While the foregoing remedial actions may be performed by controller 90, it should be appreciated that operator intervention may or may not be needed to perform some or all of the actions. For example, in practice, controller 90 may issue a user alert (e.g., visual text and/or graphics) on a computer user interface providing control instructions and/or a recommended course of action. An operator may interact with plant equipment—either manually or through a controller interface (e.g., computer) controlling the plant equipment—to implement the desired actions.

In applications where there are multiple different chemical additives available for introduction into the cooling water, controller 90 may select one or more of the different chemical additives to be introduced into the cooling water by controlling valve(s) and/or pump(s) fluidly coupling the one or more different chemical additives to the cooling water stream. For example, controller 90 may vary the type of chemical additive introduced into the cooling water and/or the rate at which the chemical additive is introduced into the cooling water.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A water analysis and chemical control system for a continuous casting process, the system comprising:

- a continuous caster having a cooling zone comprising a plurality of spray nozzles configured to spray water on a metal being cast;
- a water recycle system comprises at least a gravity settling tank, a filter, and a cooling tower, wherein:
  - the gravity settling tank is fluidly connected to the cooling zone of the continuous caster, the gravity settling tank being configured to receive water from the cooling zone of the continuous caster after the water contacts the metal being cast and gravity separate the received water to provide a gravity separated water stream;
  - the filter is downstream of the gravity settling tank and is configured to receive the gravity separated water stream and filter the gravity separated water stream to provide a filtered water stream; and
  - the cooling tower is downstream of the filter and is configured to receive the filtered water and reduce a temperature of the filtered water stream through evaporative cooling to provide cooling water that is supplied to the plurality of spray nozzles of the continuous caster;
- a plurality of sensors configured to measure at least one characteristic of a water sample subject to analysis, each of the plurality of sensors being fluidly connected at a different location in the water recycle system to measure the at least one characteristic of the water sample at each different location;
- a pump positioned to introduce a chemical additive into water in the water recycle system; and
- a controller communicatively coupled to the plurality of sensors and the pump, the controller being configured to:
  - receive data from each of the plurality of sensors indicative of the at least one characteristic of the water sample measured by each of the plurality of sensors;
  - determine a composite water quality value based on the received data from each of the plurality of sensors; and
  - control the pump to control addition of the chemical additive into the water based on the determine composite water quality value.

2. The system of claim 1, wherein:

- at least one of the plurality of sensors is positioned to measure the at least one characteristic of the water sample at a location upstream of the cooling tower, and
- at least one of the plurality of sensors is positioned to measure the at least one characteristic of the water sample at a location downstream of the cooling tower.

3. The system of claim 1, wherein:

- at least one of the plurality of sensors is positioned to measure the at least one characteristic of the water sample from the gravity separated water stream, and
- at least one of the plurality of sensors is positioned to measure the at least one characteristic of the water sample from the filtered water stream.

4. The system of claim 1, further comprising a strainer fluidly connected between the cooling water tower and the plurality of spray nozzles, the strainer being configured to strain the cooling water prior to supply to the plurality of spray nozzles of the continuous caster, wherein at least one of the plurality of sensors is positioned to measure the at least one characteristic of the water sample downstream of the strainer and upstream of the spray nozzles.

5. The system of claim 1, wherein the controller is configured to determine the composite water quality value based on the received data from each of the plurality of sensors by at least applying a weighting factor to the received data from each of the plurality of sensors to generate weighted sensor values.

6. The system of claim 5, wherein applying the weighting factor to the received data from each of the plurality of sensors comprises applying different weighting factor values to received data from different ones of the plurality of sensors.

7. The system of claim 5, wherein the controller is configured to determine the composite water quality value based on a summation of the weighted sensor values.

8. The system of claim 1, wherein the controller is configured to compare the composite water quality value to a threshold water quality value and control the pump to control addition of the chemical additive into the water if the composite water quality value crosses the threshold water quality value.

9. The system of claim 1, wherein the plurality of sensors comprise a plurality of optical sensors configured to make an optical measurement of the water sample.

10. The system of claim 1, wherein the at least one water characteristic comprises turbidity.

11. The system of claim 1, further comprising at least one sensor configured to measure a characteristic of water in the cooling tower, wherein the controller is configured to receive data from the at least one sensor indicative of the water characteristic in the cooling tower and determine the composite water quality value based on both the received data from each of the plurality of sensors and the received data from the at least one sensor indicative of the water characteristic in the cooling tower.

12. The system of claim 11, wherein the characteristic of water in the cooling tower comprises at least one of conductivity, pH, and oxidation-reduction potential (ORP).

13. The system of claim 1, wherein the controller is further configured to receive data indicative of water flow through the plurality of spray nozzles and determine the composite water quality value based on both the received data from each of the plurality of sensors and the received data indicative of water flow through the plurality of spray nozzles.

14. The system of claim 13, wherein the data indicative of water flow through the plurality of spray nozzles comprises at least one of a flow rate of water supplied to the plurality of spray nozzles and a pressure of water supplied to the plurality of spray nozzles.

15. The system of claim 1, wherein the pump is positioned to control addition of the chemical additive to the gravity settling tank.

16. A water analysis system for a continuous casting process, the system comprising:

a continuous caster having a cooling zone comprising a plurality of spray nozzles configured to spray water on a metal being cast;

a water recycle system comprises at least a gravity settling tank, a filter, and a cooling tower, wherein:

the gravity settling tank is fluidly connected to the cooling zone of the continuous caster, the gravity settling tank being configured to receive water from the cooling zone of the continuous caster after the water contacts the metal being cast and gravity separate the received water to provide a gravity separated water stream;

the filter is downstream of the gravity settling tank and is configured to receive the gravity separated water stream and filter the gravity separated water stream to provide a filtered water stream; and the cooling tower is downstream of the filter and is configured to receive the filtered water and reduce a temperature of the filtered water stream through evaporative cooling to provide cooling water that is supplied to the plurality of spray nozzles of the continuous caster;

a plurality of sensors configured to measure at least one characteristic of a water sample subject to analysis, each of the plurality of sensors being fluidly connected at a different location in the water recycle system to measure the at least one characteristic of the water sample at each different location;

a display; and one or more controllers configured to:

receive data measured from each of the plurality of sensors indicative of the at least one characteristic of the water sample measured by each of the plurality of sensors;

determine a composite water quality value based on the received data from each of the plurality of sensors; and control the display to display information indicative of the composite water quality value.

17. The system of claim 16, wherein the one or more controllers are configured to compare the determined composite water quality value to a plurality of threshold water quality values and control the display to display different composite water quality classifications based on which one or more of the plurality of threshold water quality values the determined composite water quality value crosses.

18. The system of claim 17, wherein the one or more controllers are configured to compare the determined composite water quality value to a threshold water quality value and control the display to issue an alert if the determined composite water quality value crosses the threshold water quality value.

* * * * *